United States Patent [19]
Tokugawa

[11] Patent Number: 4,676,555
[45] Date of Patent: Jun. 30, 1987

[54] SEAT BELT ANCHOR MECHANISM
[75] Inventor: Osamu Tokugawa, Fujisawa, Japan
[73] Assignee: NSK-Warner K.K., Japan
[21] Appl. No.: 780,999
[22] Filed: Sep. 27, 1985
[30] Foreign Application Priority Data
 Oct. 9, 1984 [JP] Japan ................. 59-151757
[51] Int. Cl.[4] ................. A62B 35/00; B60R 22/18
[52] U.S. Cl. ................. 297/473; 297/216; 297/468
[58] Field of Search ............ 297/216, 468, 473, 470; 248/393, 429, 430; 280/804

[56] References Cited

U.S. PATENT DOCUMENTS 4,248,480 2/1981 Koucky et al. ............ 297/448 X
4,281,871 8/1981 Grittner et al. ............ 248/429 X

FOREIGN PATENT DOCUMENTS

2634218 A1 2/1978 Fed. Rep. of Germany .
2803896 8/1979 Fed. Rep. of Germany ...... 297/473
2400898 C2 6/1983 Fed. Rep. of Germany .
59-61046 4/1984 Japan .

Primary Examiner—William E. Lyddane
Assistant Examiner—Peter R. Brown
Attorney, Agent, or Firm—Wegner & Bretschneider

[57] ABSTRACT

A seat belt anchor mechanism has such a structure that a base plate connected to the side of a vehicle body is separated from its corresponding seat-side member or members subsequent to the occurrence of an emergency so as to permit free sliding of the associated set even after a load of at least a predetermined level has been applied to the webbing. The separation can be achieved by a combination of brackets which are normally kept in engagement but in the event of an emergency are readily disengaged. Alternatively, a shear pin may also be used. The seat belt anchor mechanism permits easy escape of an occupant from a vehicle even in the event of an emergency such as collision.

10 Claims, 8 Drawing Figures

SEAT BELT ANCHOR MECHANISM

BACKGROUND OF THE INVENTION

1. Field of the Invention

This invention relates to a seat belt anchor mechanism suitable for use in an occupant-restraining seat belt system in order to fasten the associated webbing to the side of the associated vehicle body in the event of an emergency, and particularly to a separable seat belt anchor mechanism in which its seat-side element or elements and its webbing-side element or elements are separated from each other to permit free sliding of the associated seat in the event of an emergency.

2. Description of the Prior Art

There have conventionally been known various seat belt anchor mechanisms, each of which is composed of an anchor stay defining a plurality of interlocking teeth and fixed on the side of a vehicle body, a base plate carrying an occupant-restraining webbing fastened thereto and being movable as an integral member together with the associated seat along the anchor stay when the seat is caused to slide back and forth, and an interlocking member provided fixedly on the base plate for engagement with any one of the interlocking teeth. In such conventional seat belt anchor mechanisms, the associated seats were unable to slide even after emergencies such as vehicle collisions, because the base plates coupled to the corresponding vehicle bodies by way of their associated interlocking portions and anchor stays were kept connected with the sides of the associated seats. They were thus accompanied by a problem that the occupants, who wore the webbings, were not allowed to escape promptly from their seats with ease after the occurrence of such emergencies. This problem is serious particularly for occupants in the rear seat of a two-door car.

SUMMARY OF THE INVENTION

An object of this invention is to provide a seat belt anchor mechanism of such a structure that a base plate connected to the side of a vehicle body is separated from its corresponding seat-side member or members subsequent to the occurrence of an emergency so as to permit free sliding of the associated seat even after a load of at least a predetermined level has been applied to the webbing.

In one aspect of this invention, there is thus provided a seat belt anchor mechanism for mounting on a vehicle body, which comprises:

an anchor stay defining a plurality of interlocking teeth and adapted for fixed mounting on the side of the vehicle body;

a base plate for fastening an occupant-restraining webbing thereto, said base plate being movable as a unitary member together with the associated seat along the anchor stay when the seat is caused to slide back and forth;

an interlocking member provided fixedly on the base plate for engagement with any one of the interlocking teeth;

connecting means interposed between the base plate and seat and uniting the base plate and seat together, said connecting means including a deformable portion, which permits engagement between the interlocking member and any one of the interlocking teeth when a load of at least a predetermined level is applied to the base plate from the webbing, and separation means for releasing the connection between the base plate and seat upon deformation of the deformable portion.

In the seat belt anchor mechanism of this invention, the base plate and the seat-side member or members are connected together as unitary members by the connecting means which includes the separation means adapted to release the connection between the base plate and seat upon deformation of the deformable part in the event of an emergency. The present invention can therefore provide with a simple structure and at a low manufacturing cost a separable seat belt anchor mechanism which normally keeps the base plate coupled to the side of the seat without failure but permits easy and quick separation of the base plate from the side of the seat in the event of an emergency. Therefore, occupants are allowed to escape easily from their seats in the events of emergencies. This feature is important and advantageous particularly when vehicles have caught fire after their collisions or have plunged into water.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
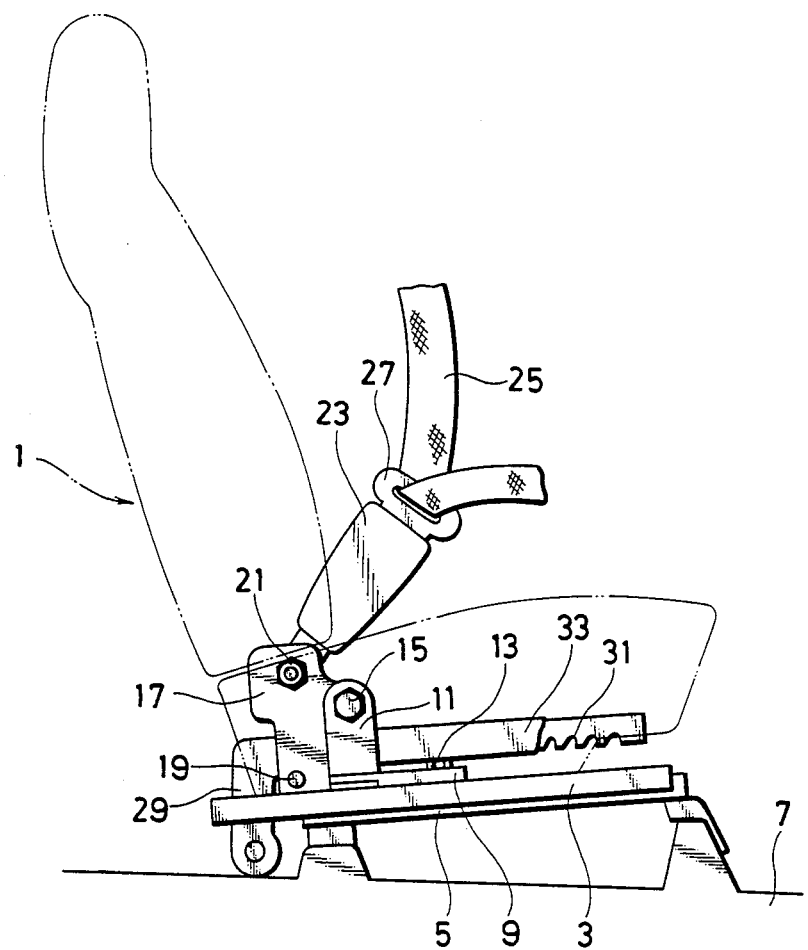
FIG. 1 is a front view of a seat belt anchor mechanism according to the first embodiment of this invention and its associated elements.

Referring first to FIG. 1, a seat 1 is mounted on the floor 7 of a vehicle by way of slide rail 3 and seat adjuster 5, both of which are fixedly provided with the seat 1, in such a way that the position of the seat 1 is adjustable back and forth along the longitudinal axis of the vehicle.

A combination of brackets 9,11 are separably coupled together to make up separation means. The lower bracket 9 is fixedly attached to the slide rail 3 by means of a bolt 13. On the other hand, the upper bracket 11 is fixedly attached to a base plate 17 by means of a bolt 15. Thus, connecting means is constructed by both of the brackets 9,11. A pin 19 is fixedly attached as an interlocking member to a lower end part of the base plate 17, while a buckle 23 is swingably attached to an upper end part of the base plate 17 by way of a bolt 21. A tang 27 which carries a webbing 25 fastened thereto is detachably inserted in a buckle 23.

On the other hand, an anchor stay 29 fixed at one end thereof to the side of the vehicle body is provided at the side of the seat 1. A part of the anchor stay 29 defines a plurality of interlocking teeth 31 and extends substantially in parallel with the longitudinal axis of the vehicle. This teeth-defining part is covered by a thin-walled plastic cover 33 in order to improve the appearance and to protect the clothing of the webbing user.

Figure 2:
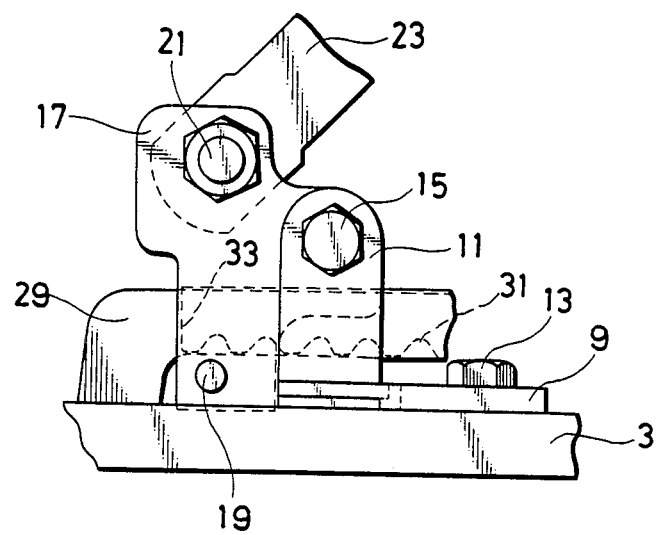
FIG. 2 is a fragmentary front view of the seat belt anchor mechanism.
Figure 3:
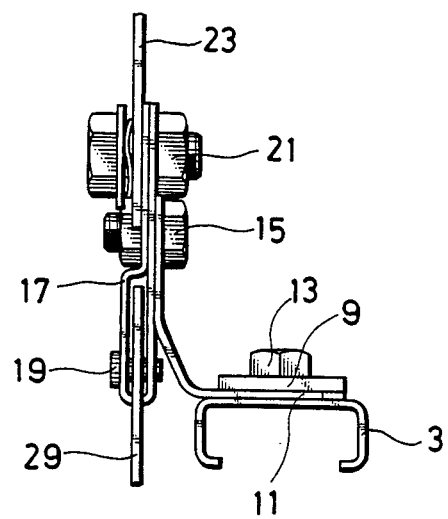
FIG. 3 is a fragmentary side view of the seat belt anchor mechanism.

As shown on an enlarged scale in FIGS. 2 and 3, the base plate 17 has been formed by folding a sheet of plate. Through plate portions which are located above the folded part and extend substantially in parallel with a suitable interval therebetween, the teeth-defining part of the anchor stay 29 extends.

Figure 4:
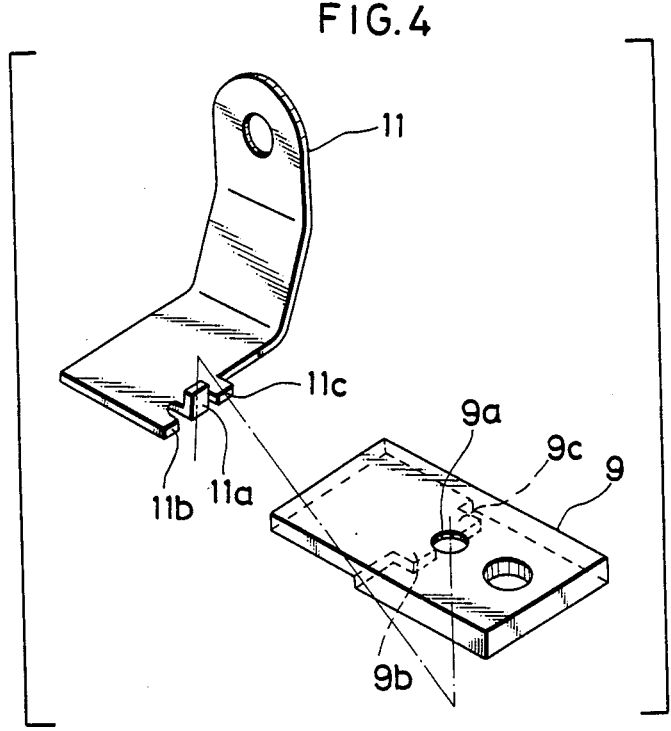
FIG. 4 is an exploded perspective view of a combination of brackets in the seat belt anchor mechanism, showing the manner of linkage of the brackets.
Figure 5:
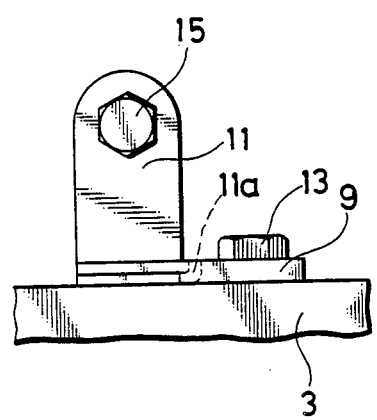
FIGS. 5 and 6 illustrate the operation of the seat belt anchor mechanism.

As illustrated in FIG. 4, the upper bracket 11 is of an L-like configuration, and has an upwardly-extending lug 11a and a pair of horizontally-extending lugs 11b,11c which are respectively located at both sides of the lug 11a. The other bracket 9 defines a through-hole 9a adapted to receive the lug 11a therein and downwardly-flared recesses 9a,9b in which the pair of lugs 11b,11c are fit respectively. Normally, in other words, while the slide rail 3 is kept in fitting engagement with the seat adjuster 5 and is allowed to move back and forth along the seat adjuster 5, the brackets 9,11 are coupled together owing to the engagement between the lug 11a and the through-hole 9a. Accordingly, the brackets 9,11 are allowed to move together and the base plate 17 and buckle 23 are hence allowed to move along the anchor stay 29. Under normal situations where loads smaller than a prescribed level are applied to the bracket 11 from the webbing 25 by way of the buckle 23 and base plate 17, a lower part of the bracket 11 is held between the lower surface of the stepped part of the bracket 9 and the upper surface of the slide rail 3 and the combined portions of the brackets 9,11 are thus kept in the coupled state.

The operation of the seat belt anchor mechanism according to the first embodiment will next be described.

When the seat 1 is caused to slide along the adjuster 5 as mentioned above under normal circumstances, the buckle 23 is also allowed to move together with the seat 1. As long as the load applied to the webbing 25 remains smaller than a prescribed level, the buckle 23 is continuously connected to the seat 1 by way of the base plate 17, both brackets 9,11 and slide rail 3. Hence, the webbing user is restrained in safety and comfort by the webbing 25.

Figure 6:
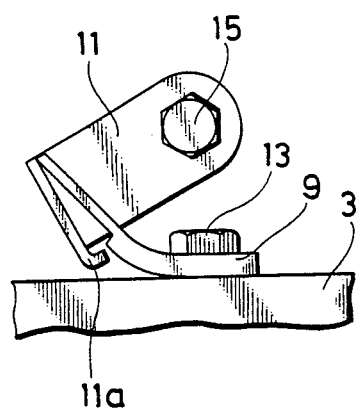

In the event of an emergency such as a vehicle collision in which a load of the predetermined level or greater is applied to the webbing 25, the lower part of the bracket 11 is twisted by a moment of a predetermined value or greater between the lower surface of the bracket 9 and the upper surface of the slide rail 3 and the step-forming part of the bracket 9, which part is deformable, is deformed upwardly as depicted in FIG. 6. The base plate 17 is then tilted, whereby the pin 19 destroys the plastic cover 33 and engages any one of the interlocking teeth 31 of the anchor stay 29. Therefore, the buckle 23 is connected to the side of the vehicle body by way of the base plate 17 and anchor stay 29. At the same time, the lower part of the upper bracket 11 is caused to separate from the stepped part of the lower bracket 9, leading to disengagement of the lugs 11a,11b,11c from their corresponding through-hole 9a and recesses 9b,9c and finally resulting in disengagement of the coupled portions of the brackets 9,11. In this manner, the base plate 17 is separated from the seat-side members to permit free sliding of the seat 1 after the occurrence of an emergency.

Figure 7:
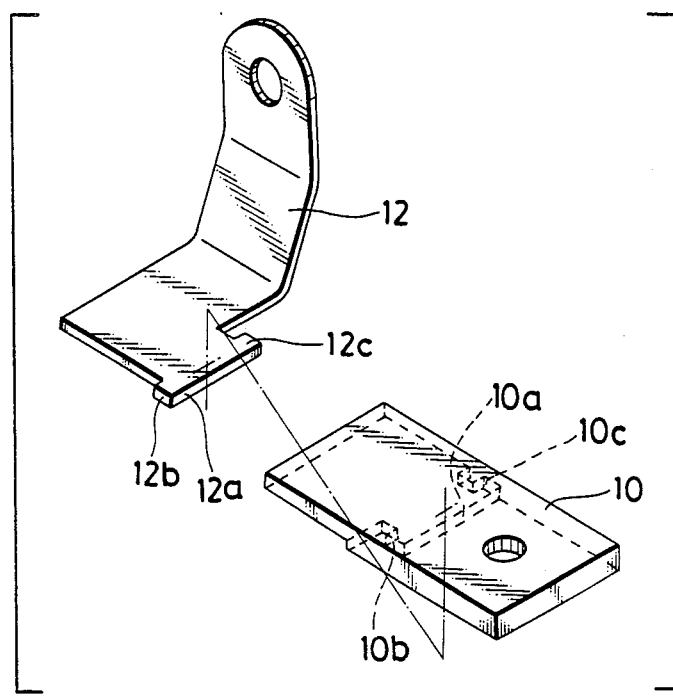
FIG. 7 is an exploded perspective view of a combination of brackets in a seat belt anchor mechanism according to the second embodiment of this invention, showing the manner of linkage of the brackets.

Referring next to FIG. 7 in which the seat belt anchor mechanism according to the second embodiment of this invention is illustrated with brackets 10,12 coupled together in a manner different from the brackets 9,11. In the second embodiment, a sidewardly-extending T-shaped tab 12 is formed on a lower part of the bracket 12. On the other hand, a T-shaped recess 10a of a configuration corresponding to the T-shaped tab 12 is formed in a stepped portion of the bracket 10. Both brackets 10,12 are normally kept in engagement primarily owing to the engagement between side lugs 12b,12c, which are located at both sides of the T-shaped tab 12, and their corresponding faces 10b,10c of the recess 10a. In the event of an emergency, they are disengaged in substantially the same manner as in the first embodiment.

Figure 8:
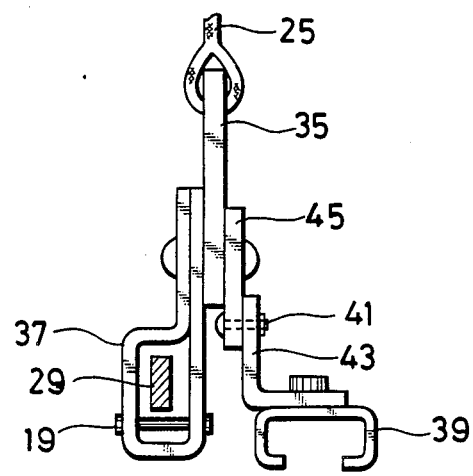
FIG. 8 is a fragmentary side view of a seat belt anchor mechanism according to the third embodiment of this invention.

Now, the third embodiment of this invention is described with reference to FIG. 8. The base plate is composed of a main part 35 and bracket part 37. The main part 35 of the base plate is connected to a seat rail or slide rail 39 by means of two brackets 43,45, which are in turn connected together by a shear pin 41 which makes up separating means. The webbing 25 is fastened directly to the main part 35 of the base plate. The anchor stay 29 and interlocking pin 19 are substantially the same as those employed in the first embodiment.

When the main part 35 is pulled by a force of a predetermined level or greater in the third embodiment, the bracket 43 which serves as a deformable part is deformed, thereby being elongated upwardly. Here, the bracket part 37 which is connected as a unitary member with the main part 35 is also caused to move upwardly so that the interlocking pin 19 is brought into engagement with the anchor stay 29. The shear pin 41 is broken by a suitable force (for example, 1,000 kgf) so that the elements arranged at the side of the base plate are separated from those disposed at the side of the seat. The shear pin 41 may be broken either before the pin 19 and anchor stay 29 are brought into mutual engagement or after the anchor stay 29 has undergone a slight upward movement due to its flexure or its swinging motion about the point of its connection to the vehicle body after the engagement between the pin 19 and anchor stay 29.

Having now fully described the invention, it will be apparent to one of ordinary skill in the art that many changes and modifications can be made thereto without departing from the spirit or scope of the invention as set forth herein.

What is claimed is:

1. A seat belt anchor mechanism for mounting on a vehicle body, which comprises:
    an anchor stay defining a plurality of interlocking teeth and adapted for fixed mounting on the side of the vehicle body;
    a base plate for fastening an occupant-restraining webbing thereto, said base plate being movable as a unitary member together with the associated seat along the anchor stay when the seat is caused to slide back and forth;
    an interlocking member provided fixedly on the base plate for engagement with any one of the interlocking teeth;
    connecting means interposed between the base plate and seat and uniting the base plate and seat together, said connecting means including a deformable portion, which permits engagement between the interlocking member and any one of the interlocking teeth when a load of at least a predetermined level is applied to the base plate from the webbing, and separation means for releasing the connection between the base plate and seat upon deformation of the deformable portion.

2. A seat belt anchor mechanism as claimed in claim 1, wherein the connecting means includes a combination of brackets separably coupled together at portions thereof which make up the separation means, and when the load of said at least a predetermined level is applied to the base plate from the webbing, a part of at least one of the coupled brackets undergoes a deformation, whereby the interlocking member is brought into engagement with said one of the interlocking teeth so as to connect the base plate to the side of the vehicle body and at the same time the connection of the brackets at the portions is released to separate the base plate and seat from each other.

3. A seat belt anchor mechanism as claimed in claim 2, wherein the brackets are provided between a slide rail, which is provided as a unitary member with the seat, and the base plate.

4. A seat belt anchor mechanism as claimed in claim 1, wherein the connector means includes a combination of brackets separably coupled together by a shear pin which makes up the separation means, and when the load of said at least predetermined level is applied to the base plate from the webbing, a part of at least one of the coupled brackets undergoes a deformation, whereby the interlocking member is brought into engagement with said one of the interlocking teeth so as to connect the base plate to the side of the vehicle body and at the same time the shear pin is broken to separate the base plate and seat from each other.

5. A seat belt anchor mechanism for mounting on a vehicle body, which comprises:
an anchor stay defining a plurality of interlocking teeth and adapted for mounting on the vehicle body;
a base plate for fastening an occupant-restraining webbing thereto, said base plate being movable along the anchor stay;
an interlocking member provided on the base plate for engagement with any one of the interlocking teeth;
a first bracket coupled with the base plate, said first bracket having first cooperating releasable interconnecting means; and
a second bracket for mounting on the associated seat, said second bracket having second cooperating interconnecting means and being normally releasably connected with the first bracket by the interconnection of said first and second interconnecting means to thereby connect said second bracket to the base plate, whereby when a load of at least a predetermined level is applied to the base plate from the webbing, said second bracket undergoes a deformation to bring the interlocking member into engagement with any one of the interlocking teeth and at the same time to allow separation of said first and second interconnecting means, thus permitting separation of the second bracket from the first bracket.

6. A seat belt anchor mechanism as claimed in claim 5, wherein the first bracket defines at least one lug and the second bracket defines a recess for the reception of said at least one lug of the first bracket.

7. A seat belt anchor mechanism for mounting on a vehicle body, which comprises:
an anchor stay defining a plurality of interlocking teeth and adapted for mounting on the vehicle body;
a base plate for fastening an occupant-restraining webbing thereto, said base plate being movable along the anchor stay;
an interlocking member provided on the base plate for engagement with any one of the interlocking teeth;
a first bracket coupled with the base plate;
a second bracket for mounting on the associated seat; and
means for releasably connecting the first and second brackets together, whereby upon application by the webbing of a load of at least a predetermined level to the base, said releasable connecting means releases the first and second brackets from each other, thereby allowing said brackets to separate, to bring the interlocking member into engagment with any one of the interlocking teeth.

8. A seat belt anchor mechanism for mounting on a vehicle body, which comprises:
an anchor stay defining a plurality of interlocking teeth and adapted for mounting on the vehicle body;
a base plate for fastening an occupant-restraining webbing thereto, said base plate being movable along the anchor stay;
an interlocking member provided on the base plate for engagement with any one of the interlocking teeth;
a bracket for mounting on the associated seat; and
means for releasably connecting the bracket and base plate together, whereby upon application by the webbing of at least a predetermined level to the base, said releasable connecting means releases the bracket and the base plate, thereby allowing the bracket to separate from the base plate so as to being the interlocking member into engagement with any one of the interlocking teeth.

9. A seat belt anchor mechanism for mounting on a vehicle body, which comprises:
an anchor stay defining a plurality of interlocking teeth and adapted for mounting on the vehicle body;
a base plate for fastening an occupant-restraining webbing thereto, said base plate being movable along the anchor stay;
an interlocking member provided on the base plate for engagement with any one of the interlocking teeth;
a first bracket connected to the base plate;
a second bracket for mounting on the associated seat, said second bracket being deformable to undergo a deformation so as to allow the interlocking member to engage any one of the interlocking teeth when a load of at least a predetermined level is applied to the base plate from the webbing; and
means for releasably connecting the first and second brackets together, whereby said releasable connecting means releases said first and second brackets and said base plate, thereby allowing the first and second brackets to separate from each other when the base plate has moved together with the anchor stay subsequent to engagement of the interlocking member with any one of the interlocking teeth.

10. A seat belt anchor mechanism for mounting on a vehicle body, which comprises:
- an anchor stay defining a plurality of interlocking teeth and adapted for mounting on the vehicle body;
- a base plate for fastening an occupant-restraining webbing thereto, said base plate being movable along the anchor stay;
- an interlocking member provided on the base plate for engagement with any one of the interlocking teeth;
- a deformable bracket for mounting on the associated seat, said bracket undergoing a deformation to permit engagement of the interlocking member with any one of the interlocking teeth when a load of at least a predetermined level is applied to the base plate from the webbing; and
- means for releasably connecting the bracket and base plate together, said releasable connecting means releases said bracket and said base plate, thereby allowing the base plate and bracket to separate from each other when the base plate has moved together with the anchor stay subsequent to engagement of the interlocking member with any one of the interlocking member with any one of the interlocking teeth.

* * * * *